United States Patent [19]
Lewis et al.

[11] Patent Number: 5,841,528
[45] Date of Patent: Nov. 24, 1998

[54] ANTI COUNTERFEIT APPARATUS

[75] Inventors: Keith Loder Lewis; Kevin Roy Welford, both of Malvern, Great Britain

[73] Assignee: The Secretary of State for Defence in Her Britannic Majesty's Government of the United Kingdom of Great Britain and Northern Ireland, Hants, United Kingdom

[21] Appl. No.: 737,293
[22] PCT Filed: May 9, 1995
[86] PCT No.: PCT/GB95/01036
§ 371 Date: Nov. 8, 1996
§ 102(e) Date: Nov. 8, 1996
[87] PCT Pub. No.: WO95/30972
PCT Pub. Date: Nov. 16, 1995

[30] Foreign Application Priority Data

May 9, 1994 [GB] United Kingdom .................... 9409128

[51] Int. Cl.⁶ ...................................................... G01N 21/00
[52] U.S. Cl. .......................... 356/237; 356/388; 356/394; 356/71
[58] Field of Search ..................................... 356/237, 388, 356/394, 71

[56] References Cited

U.S. PATENT DOCUMENTS

| 3,281,960 | 11/1966 | Gross . | |
|---|---|---|---|
| 5,504,594 | 4/1996 | Yamazaki | 356/71 |
| 5,530,772 | 6/1996 | Storey | 356/71 |
| 5,568,251 | 10/1996 | Davies | 356/71 |

FOREIGN PATENT DOCUMENTS

| 1394021 | 1/1972 | Canada . |
| 0552564 | 7/1993 | European Pat. Off. . |
| 0568185A2 | 11/1993 | European Pat. Off. . |
| 2696554 | 4/1994 | France . |
| 1213193 | 2/1968 | United Kingdom . |
| 1512018 | 8/1974 | United Kingdom . |
| WP91/03031 | 3/1991 | WIPO . |

Primary Examiner—Frank G. Font
Assistant Examiner—Reginald A. Ratliff
Attorney, Agent, or Firm—Nixon & Vanderhye P.C.

[57] ABSTRACT

Apparatus for distinguishing between genuine and counterfeit articles whereby a first optical filter is applied to genuine articles and suspect articles are scanned with the aid of a suitable second optical filter. Scanning of genuine articles incorporating first optical filter with the aid of suitable second optical filter gives rise to optical effects which would not otherwise be apparent.

10 Claims, 4 Drawing Sheets

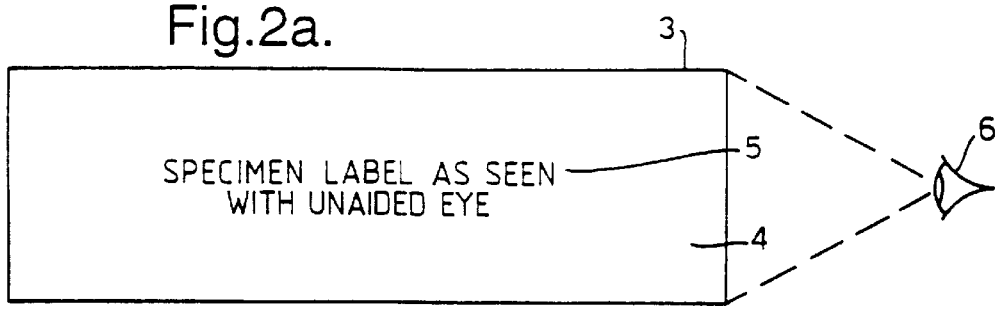
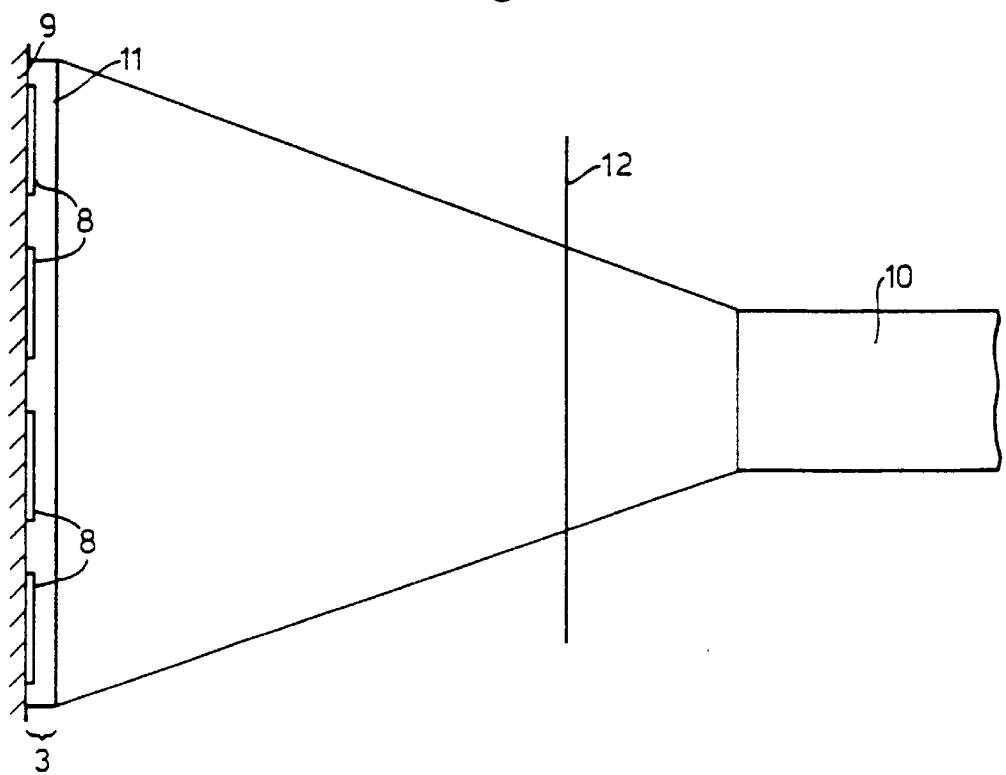

5,841,528

ANTI COUNTERFEIT APPARATUS

BACKGROUND OF THE INVENTION

1. Field of the Invention

This invention relates to the covert identification of genuine and counterfeit articles, and has particular (but not exclusive) relevance to the retail trade.

2. Discussion of Prior Art

Counterfeiting of articles is a long standing problem in, for example, the retail trades and credit card industry. Lost revenue, legal liability for claims and guarantees, and damage to goodwill can seriously affect a company. This is an international problem with virtually every country in the world a victim. Some recent estimates put the annual loss to, for example, the European motor parts industry at US$200 million. For perfume companies the estimated figure is US$70 million and for the record industry the estimated annual loss is at least US$1 billion.

The need for an effective means of combating counterfeiting has been the subject of considerable effort in the past. One of the most common ways of indicating the origin of goods is by the use of trade marks. Such marks, which are directed primarily at the customer, are obvious to the counterfeiter and readily lend themselves to copying. As a countermeasure some marks have become increasingly complex in design, sometimes incorporating sophisticated optical effects such as holograms, diffraction effects etc. Counterfeiting on a large scale however, is carried out by gangs of organised criminals with considerable resources and access to the most up to date technology and these have proved equal to the task of copying even the most sophisticated marks.

UK patent application no. GB 9324214.7 relates to a covert marking system in which genuine articles are endowed with a label whose appearance is very different when scanned using equipment which is sensitive to radiation in the near infrared region of the electromagnetic spectrum. However, the need for such scanning equipment gives rise to some inconvenience.

European patent application EP 0 568 185 A2 describes an authenticity identifying structure for an article. By that invention, the article has an identification region and reflected light from said region is examined for certain properties in order to confirm the authenticity of said article. The invention requires a monochromatic light source and relies upon the plane of polarisation of the reflected signal.

Another problem associated with counterfeiting concerns the safety of any agent employed to check the authenticity of suspect articles. Experience has shown that the organisations responsible for large scale counterfeiting are capable of extreme measures in order to protect their operations.

There is, therefore, a long felt need for an effective means of differentiating between genuine and counterfeit articles. For a system which involves labelling the articles or imparting some code, a solution to the problem of copying is required. The ideal system could be used covertly, so that the activities of the agent checking the suspect articles could remain secret.

SUMMARY OF THE INVENTION

The present invention offers a means for checking the authenticity of articles by observing said articles through simple apparatus. (Throughout this specification, reference to an "article" or "articles" should be taken to relate to said article or articles or the associated packaging or wrapping). The system readily lends itself to covert use and is effective under normal lighting conditions. It has the additional advantage that although the counterfeiter may be aware of its general use, the labels used and any codes contained therein, may be continuously changed so that copying becomes less worthwhile.

According to this invention, apparatus for checking the authenticity of articles comprises:

a first optical filter applied to a genuine article and a second optical filter through which suspect articles are examined, and is characterised in that the transmittance versus wavelength characteristic of each of the optical filters has a plurality of peaks or troughs.

Preferably one or more of the peaks or troughs present in the transmittance versus wavelength characteristic of the first optical filter corresponds in wavelength to a peak or trough in the transmittance versus wavelength characteristic of the second optical filter.

The respective transmittance versus wavelength characteristics of the two filters may be complementary or similar.

In a preferred embodiment, the first optical filter is incorporated in a label which is applied to the genuine article.

In a further preferred embodiment the second optical filter is incorporated in a pair of spectacles.

In another preferred embodiment the first optical filter is incorporated in a paint.

In another preferred embodiment the first optical filter is deposited on a polymer film which is subsequently applied to genuine articles.

In a further preferred embodiment one or both of the optical filters may be derived from a plurality of components, the components being deposited on layers of polymer film which are subsequently laminated together to produce the said filter or filters.

According to a second aspect of the invention, a method of checking the authenticity of articles comprises the steps of applying a first optical filter to genuine articles and viewing or scanning suspect articles through a second optical filter in order to confirm the presence of said first optical filter, and is characterised in that the transmittance versus wavelength characteristic of each of the optical filters has a plurality of peaks or troughs.

BRIEF DESCRIPTION OF THE DRAWINGS

The invention will now be described, by example only, with reference to the following figures in which:

FIG. 2a represents a label incorporating a typical first filter as seen when viewed without the aid of a suitable second filter;

FIG. 2b represents the same label incorporating a typical first optical filter as seen when viewed with the aid of a suitable second filter;

FIG. 3 illustrates the use of the current invention in the infrared region of the electromagnetic spectrum;

DETAILED DISCUSSION OF PREFERRED EMBODIMENTS

Figure 1A:
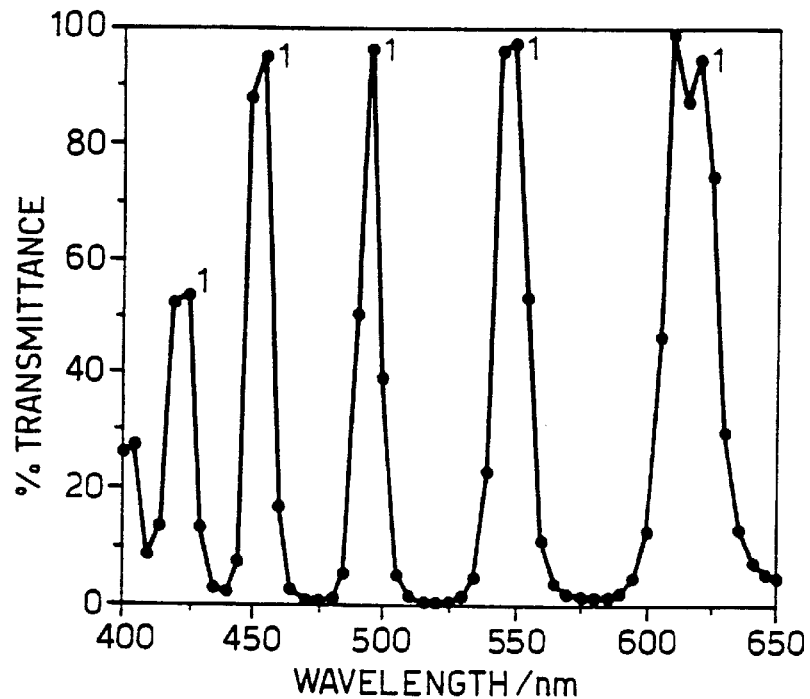
FIGS. 1a and 1b each show modelled data representing the transmittance versus wavelength characteristic of one of a pair of complementary optical filters.

Referring to FIG. 1a the transmittance versus frequency characteristic of one of the pair of filters comprises a series of peaks 1 in transmittance distributed throughout the wavelength range of interest.

Figure 1B:
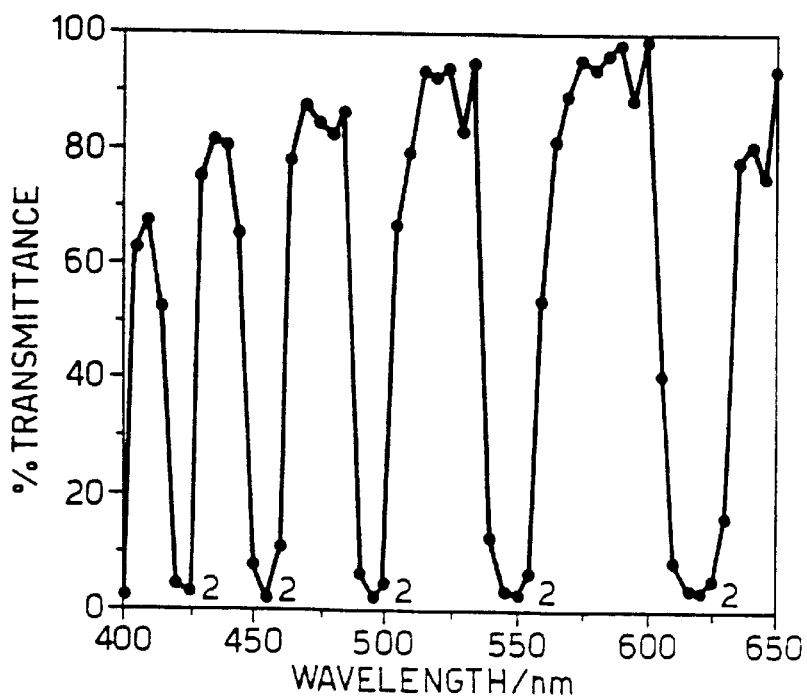

Referring to FIG. 1b the transmittance versus frequency characteristic of the other of the pair of filters comprises a series of notches 2 in transmittance distributed throughout the wavelength range of interest.

From a comparison of the two figures it can be seen that each peak in the former has a corresponding notch (at a similar wavelength) in the latter. Such a pair of filters, in which the peaks of one are coincident with the notches of the other is said to be complementary. Typically, when one of these filters is viewed with the unaided eye it can be seen (albeit with some residual tinting), but when viewed through the other filter it appears black.

Referring to FIG. 2a, label 3 comprises a background 4 which incorporates a first filter and a pattern (in this example characters 5) printed in black ink. When viewed through the unaided eye 6 (or suitable scanning equipment) a marked contrast is observed between background 4 and the characters 5. Referring to FIG. 2b when the same label 3 is viewed through a second optical filter 7 which is complementary to the first, the whole label appears black.

Tables 1 and 2 show device structures which give rise to the predicted transmittance versus wavelength characteristics shown in FIGS. 1a and 1b respectively. The individual layers of these devices can be laid down most suitably using vapour phase deposition techniques which are well known to those skilled in the art: see for example, "Thin Film Optical Filters" by H A Macleod, published by Hilger. 1986. Other techniques are possible for the realisation of the filters including the holographic exposure and fixing of photosensitive film.

TABLE 1

| Material | Optical Thickness |
| --- | --- |
| Air | Medium |
| ZnS | 0.25 |
| SiO$_2$ | 0.25 |
| ZnS | 3.75 |
| SiO$_2$ | 0.25 |
| ZnS | 0.25 |
| SiO$_2$ | 0.25 |
| ZnS | 0.25 |
| SiO$_2$ | 0.25 |
| ZnS | 3.75 |
| SiO$_2$ | 0.25 |
| ZnS | 0.25 |
| Glass | Substrate |

TABLE 2

| Material | Optical Thickness |
| --- | --- |
| Air | Medium |
| TiO$_2$ | 4.0 |
| SiO$_2$ | 0.25 |
| TiO$_2$ | 4.0 |
| SiO$_2$ | 0.25 |
| TiO$_2$ | 4.0 |
| SiO$_2$ | 0.25 |
| TiO$_2$ | 4.0 |
| SiO$_2$ | 0.25 |
| TiO$_2$ | 4.0 |
| Glass | Substrate |

The filter described by table 1 is a coupled Fabry-Perot etalon with each cavity working in multiple order. Table 2 represents a distributed Bragg reflector design.

Other embodiments of the invention will be apparent to those skilled in the art. For example the transmittance versus wavelength characteristics of the two filters may be similar, that is the peaks and/or notches in transmittance would appear at the same frequencies in both filters. In this case the observer (or scanning equipment) would see a modulation in the reflection characteristics of the label as the angular position from which the first filter is viewed varies.

Also the principles applied and effects observed could be exploited, with the aid of suitable scanning equipment, outside the visible part of the electromagnetic spectrum. It is envisaged that the current invention could be combined with, for example, infrared systems.

The number of peaks and notches associated with each filter is also variable as is the wavelength at which they occur and the spacing of these spectral features can be symmetric or non-symmetric.

Those features of the filter (or label) applied to the article which are visible to the unaided eye may be incorporated into other visible features of the article, for example a trademark, surface decoration or a bar code.

In the examples given, the substrate is glass but this is not intended as limiting.

The filter to be incorporated into a label may be realised as a paint by incorporation of flakes of filter into a suitable binder for ease of application (for example by spray or screen printing).

Alternatively, the layers which make up the first filter may be deposited on a polymer film which is then applied to the article. Filters with a small number of peaks and notches may be deposited on to such films which can then be laminated together in different combinations. This offers a convenient means of continuously varying the characteristics of the complete filters used.

Referring to FIG. 3, label 3 comprises a two element filter. The first element 8 is a reflector with a reflection band in the near infra-red. This could be realised using, for example, a simple quarter wave stack and applied to a partially absorbing diffuse surface 9 (eg non-white paper). When the reflector is applied (as a pattern) to the surface the diffuse reflectance of the surface would be increased at the design wavelength of the multilayer stack. This forms the reflective part of the filter which, along with the paper, provides a suitable contrast level to camera 10 whose sensitivity extends into the near infrared.

The second element 11 of the filter of which label 3 comprises is made of a dye which is absorbing in the visible region of the electromagnetic spectrum. This could be a single material or a combination of materials to give a specific optical effect. This absorbing dye is applied over the top of the first element, either as a pattern or as a complete covering patch. The combined effect inherent in this filter would appear as a black patch to the unaided eye.

A second filter 12, which is complementary to the first element in label 3, is used to separate the combined effects of the reflector 8 and absorber 11. This second filter has a narrow pass band between 800 and 900 nm allowing a good response on camera 10.

During operation the label 3 is scanned by camera 10 through filter 12 and the underlying pattern, which is obscured in the visible region, is detected.

Figure 4:
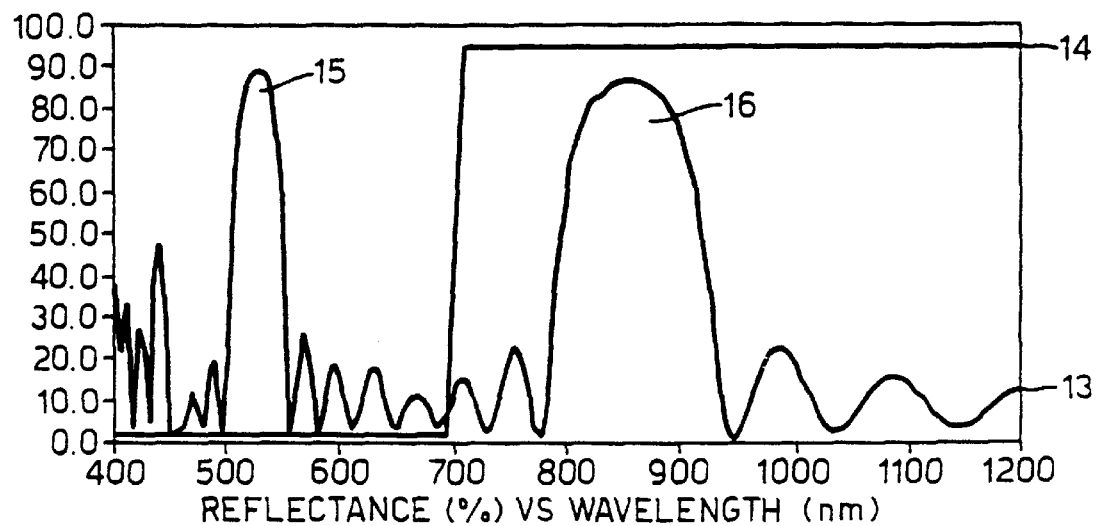
FIGS. 4 and 5 illustrate the optical characteristics of filters which could be used in the implementation illustrated by FIG. 3.

Referring to FIG. 4, the reflectance of the first element (item 8 of FIG. 3) used in a particular embodiment of the invention is shown in plot 13. The transmission of the second element (item 11 of FIG. 3) is shown in plot 14.

The reflection bands (eg 15) of the first element which are present in the visible region (wavelength below 700 nm) are obscured by the low transmission of the overlying second element in this region. However, the reflection bands (eg 16) which are present in the near infrared region (above 700 nm) are detectable (with suitable equipment) due to the high transmission of the overlying second element in this region.

Figure 5:
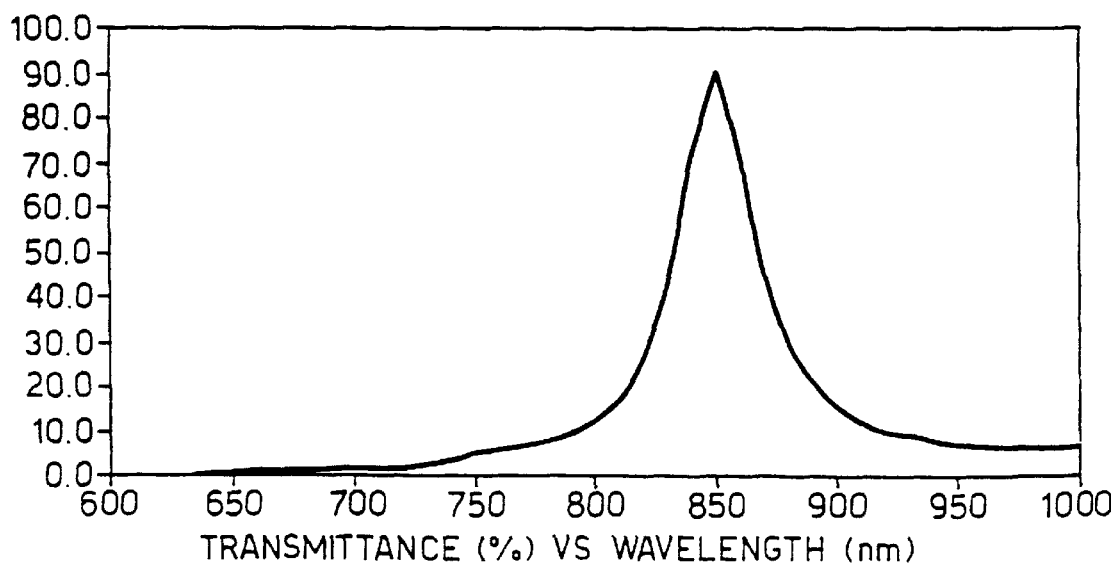

Referring to FIG. 5, the transmission of the second filter (item 12 of FIG. 3) shows a passband 17 corresponding in wavelength to a reflection band in FIG. 4. Such a filter could be realised using, for example, a Fabry-Perot design of the type $(HL)^2HH(LH)^2$ using $TiO_2$ for the high index layers and $SiO_2$ for the low, deposited on a substrate of Schott RG780 absorbing glass.

Figure 6:
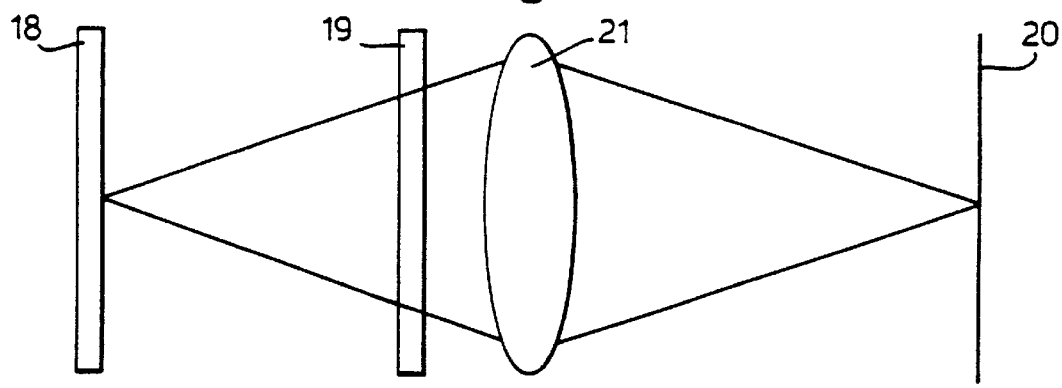
FIG. 6 illustrates a second use of the invention in the infrared region.

Referring to FIG. 6, a combination of two filters is used to produce an optical bar code. The first filter 18 has the characteristics of a Fabry-Perot type, but with a spatially wedged cavity element. The second filter 19 is a distributed Bragg reflector of the type described by table 2. Filter 19 serves to interrogate the grading produced by the spatially wedged cavity present in the first filter, to realise a series of light and dark bands in a focal plane 20 situated behind filter 19. A lens 21 is required to allow this effect to be imaged—this can be either the lens of the eye or that of a camera.

The bar code would have the spectrum of the filter 18 superimposed on it. For example the left hand side of the image could be arranged to appear blue while the right hand side would appear red. The bar code would appear as a series of discrete lines corresponding to wavelengths that had been excised from the spectrum of the first filter 18.

Figure 7A:
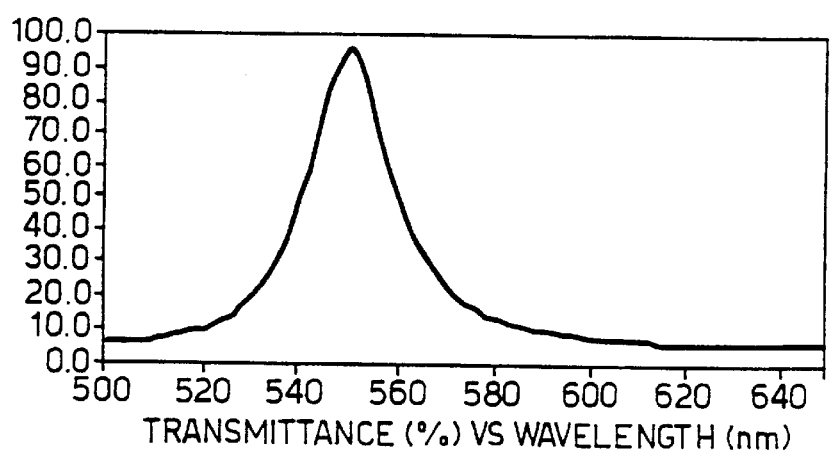
FIGS. 7a and 7b illustrate the optical characteristics of two filters which may be used in the implementation illustrated by FIG. 6.
Figure 7B:
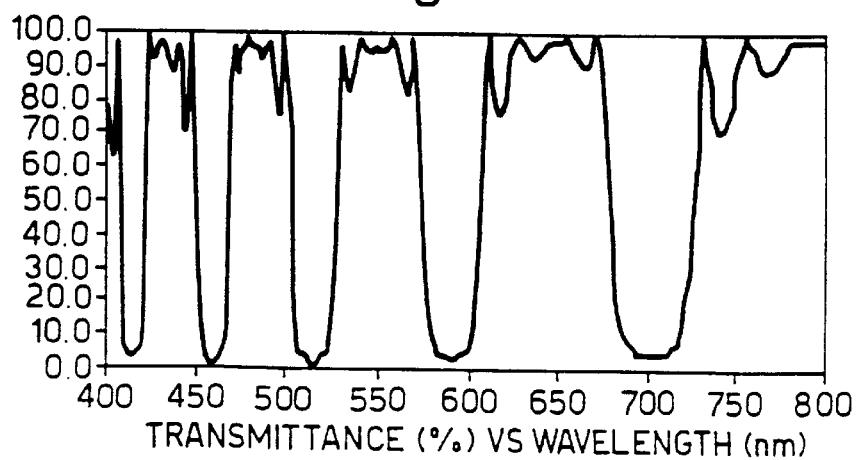

FIGS. 7*a* and 7*b* respectively show the transmittance of examples of filters 18 and 19 of FIG. 6.

We claim:

1. A system for checking the authenticity of an article comprising:

a first optical filter applied to a genuine article, the first optical filter having a first transmittance versus wavelength characteristic; and a second optical filter through which a suspect article is examined, the second optical filter having a second transmittance versus wavelength characteristic;

wherein the transmittance versus wavelength characteristic of each of the optical filters has a plurality of peaks or troughs wherein at least one peak or trough present in the first characteristic corresponds in wavelength to at least one peak or trough in the second characteristic indicating authenticity of said suspect article.

2. The system of claim 1 where the transmittance versus wavelength characteristics of the two optical filters are complementary.

3. The system of claim 1 where the transmittance versus wavelength characteristics of the two optical filters are similar.

4. The apparatus of claim 1 where the first optical filter is incorporated in a label which is applied to the genuine article.

5. The system of claim 1 where the second optical filter is incorporated in a pair of spectacles.

6. The system of claim 1 where the first optical filter is incorporated in a paint.

7. The system of claim 1 where the first optical filter is deposited on a polymer film which is subsequently applied to genuine articles.

8. The system of claim 1 where at least one of the optical filters is derived from a plurality of components, the components being deposited on layers of polymer film which are subsequently laminated together to produce the said filter.

9. A method of checking the authenticity of articles comprising the steps of:

applying a first optical filter to genuine articles, the first optical filter having a first transmittance versus wavelength characteristic; and viewing or scanning suspect articles through a second optical filter in order to confirm the presence of said first optical filter, the second optical filter having a second transmittance versus wavelength characteristic, wherein coincidence of peaks or troughs of the transmittance versus wavelength characteristic of each of the optical filters indicates authenticity of authentic articles.

10. The system of claim 1 wherein said first optical filter comprises a reflector.

* * * * *